(12) United States Patent
Zehntner et al.

(10) Patent No.: US 12,544,352 B2
(45) Date of Patent: Feb. 10, 2026

(54) DIAPER CREAM

(71) Applicant: Melaleuca, Inc., Idaho Falls, ID (US)

(72) Inventors: Rebecca L. Zehntner, Blackfoot, ID (US); Nasser A. Fredj, Ammon, ID (US)

(73) Assignee: Melaleuca, Inc., Idaho Falls, ID (US)

( * ) Notice: Subject to any disclaimer, the term of this patent is extended or adjusted under 35 U.S.C. 154(b) by 0 days.

(21) Appl. No.: 17/565,948

(22) Filed: Dec. 30, 2021

(65) Prior Publication Data
US 2022/0202761 A1 Jun. 30, 2022

Related U.S. Application Data

(60) Provisional application No. 63/133,073, filed on Dec. 31, 2020.

(51) Int. Cl.
| | | |
|---|---|---|
| *A61K 31/231* | (2006.01) | |
| *A61K 31/047* | (2006.01) | |
| *A61K 31/08* | (2006.01) | |
| *A61K 31/355* | (2006.01) | |
| *A61K 33/30* | (2006.01) | |
| *A61K 36/28* | (2006.01) | |
| *A61K 36/48* | (2006.01) | |
| *A61P 17/02* | (2006.01) | |

(52) U.S. Cl.
CPC .......... *A61K 31/231* (2013.01); *A61K 31/047* (2013.01); *A61K 31/08* (2013.01); *A61K 31/355* (2013.01); *A61K 33/30* (2013.01); *A61K 36/28* (2013.01); *A61K 36/48* (2013.01); *A61P 17/02* (2018.01)

(58) Field of Classification Search
None
See application file for complete search history.

(56) References Cited

U.S. PATENT DOCUMENTS

| | | |
|---|---|---|
| 2003/0031727 A1 | 2/2003 | Hahn et al. |
| 2011/0015279 A1 | 1/2011 | Doerr et al. |
| 2013/0017286 A1 | 1/2013 | Dreher et al. |
| 2013/0230609 A1 | 9/2013 | Modak et al. |
| 2014/0190507 A9 | 7/2014 | Xavier et al. |
| 2015/0044157 A1 | 2/2015 | Kulkarni et al. |
| 2015/0118165 A1 | 4/2015 | Rudolph et al. |
| 2015/0147357 A1 | 5/2015 | Gan et al. |
| 2015/0342854 A1 | 12/2015 | Shibuya et al. |
| 2017/0095411 A1 | 4/2017 | Cotrell |
| 2017/0258709 A1 | 9/2017 | Carle et al. |
| 2018/0071190 A1 | 3/2018 | Albrecht et al. |
| 2019/0105243 A1 | 4/2019 | Song et al. |
| 2020/0330381 A1 | 10/2020 | Burnam |
| 2022/0202664 A1 | 6/2022 | Zehntner |
| 2022/0202672 A1 | 6/2022 | Zehntner |

FOREIGN PATENT DOCUMENTS

| | | |
|---|---|---|
| CN | 109609261 A | 4/2019 |
| DE | 102013226281 | 6/2015 |
| EP | 2939657 | 12/2013 |
| EP | 3300715 A1 * | 4/2018 |
| EP | 3554465 | 9/2022 |
| RU | 2657805 | 6/2018 |
| RU | 2716157 | 3/2020 |
| WO | WO 2019/055961 | 3/2019 |
| WO | WO 2020/160904 | 8/2020 |

OTHER PUBLICATIONS

EQLib.ca [online], "Baby Shampoo Natural 2 in 1 Koala Kubs—Double," available on or before Apr. 18, 2021, via Internet Archive: Wayback Machine URL<https://web.archive.org/web/20210418061001/https://eqlib.ca/produit/produits-pour-bebes-et-enfants/shampooing-bebe-naturel-2-en-1-koala-kubs-double/>, retrieved on May 4, 2022, retrieved from URL<https://eqlib.ca/produit/produits-pour-bebes-et-enfants/shampooing-bebe-naturel-2-en-1-koala-kubs-double/>, 10 pages (with Machine English Translation).

EQLib.ca [online], "Koala Kubs Natural Baby Lotion—Double," available on or before Apr. 18, 2021, via Internet Archive: Wayback Machine URL<https://web.archive.org/web/20210418050002/https://eqlib.ca/produit/produits-pour-bebes-et-enfants/lotion-pour-bebe-naturelle/>, retrieved on May 4, 2022, retrieved from URL<https://eqlib.ca/produit/produits-pour-bebes-et-enfants/lotion-pour-bebe-naturelle/>, 10 pages (with Machine English Translation).

PCT International Search Report and Written Opinion in International Appln. No. PCT/US2021/065678, dated Mar. 22, 2022, 8 pages.

SharaCosmetics.com [online], "Waterproof Gel Liner," available on or before Sep. 29, 2020, via Internet Archive: Wayback Machine URL<https://web.archive.org/web/20200929204228/https://www.sharacosmetics.com/product-page/waterproof-gel-liner>, retrieved on May 4, 2022, retrieved from URL<https://www.sharacosmetics.com/product-page/waterproof-gel-liner>, 2 pages.

Choksi et al., "Validation of the OptiSafe™ eye irritation test," Cutan Ocul Toxicol, Sep. 2020, 39(3):180-192.

EssentialIngredients.com [online], "Discover a new Sensory Dimension in Hair Care Glucotain®," 2016, retrieved on Jul. 31, 2023, retrieved from URL<https://www.essentialingredients.com/pdf/ClariantGlucoTainHaircareBrochure.pdf>, 12 pages.

NewsWeek.com [online], "The Science of Shampoo: What the Ingredients Mean," Oct. 2009, retrieved on Jul. 31, 2023, retrieved from URL<https://www.newsweek.com/science-shampoo-what-ingredients-mean-222524>, 18 pages.

(Continued)

*Primary Examiner* — Terry A Mckelvey
*Assistant Examiner* — Catheryne Chen
(74) *Attorney, Agent, or Firm* — Fish & Richardson P.C.

(57) ABSTRACT

Materials and methods for formulating skin care compositions suitable for use on babies and toddlers are provided herein. For example, this document provides materials and methods for formulating diaper cream compositions that contain natural ingredients, are not irritating to babies' skin, and can be used to treat or prevent symptoms of diaper rash.

30 Claims, No Drawings

(56) References Cited

OTHER PUBLICATIONS

PCT International Preliminary Report on Patentability in International Appln. No. PCT/US2021/065678, mailed on Jul. 13, 2023, 7 pages.
TodaysParent.com [online], "Weleda Baby Calendula Shampoo and Body Wash," Jan. 2018, retrieved on Jul. 31, 2023, retrieved from URL<https://www.todaysparent.com/product-reviews/baby-care/baby-shampoo/weleda-baby-calendula-shampoo-and-body-wash/>, 53 pages.
Ilnytska et al., "Colloidal oatmeal (Avena Sativa) improves skin barrier through multi-therapy activity," J. Drugs Dermatol., Jun. 2016, 15(6):684-690.
Singh et al., "Sulfate free solutions for personal care applications," Engineering Conferences International (ECI) Digital Archives, Jul. 2018, 34 pages.

\* cited by examiner

DIAPER CREAM

CROSS-REFERENCE TO RELATED APPLICATIONS

This application claims benefit of priority from U.S. Provisional Application Ser. No. 63/133,073, filed on Dec. 31, 2020. The disclosure of the prior application is considered part of (and is incorporated by reference in) the disclosure of this application.

TECHNICAL FIELD

This document relates to materials and methods for formulating skin care compositions suitable for use on babies and toddlers. For example, this document relates to materials and methods for formulating diaper cream compositions that contain natural ingredients, are not irritating to babies' skin, and can be used to treat or prevent symptoms of diaper rash.

BACKGROUND

Young children, including babies and toddlers, typically have sensitive, delicate skin. Covering the skin of babies and toddlers with a diaper for prolonged periods of time can result in rashes with associated itching, burning, and general discomfort.

SUMMARY

This document is based, at least in part, on the development of compositions that are suitable for use as diaper creams on young children. The compositions provided herein contain natural and safe ingredients, resulting in products that are low (or non-) irritating to babies' skin. In addition, the compositions provided herein can be used to treat or prevent diaper rash, seal out wetness (e.g., under a diaper), and protect skin from chafing.

In a first aspect, this document features a skin care composition that contains decyl oleate, oleyl erucate, magnesium stearate, zinc stearate, zinc oxide, glycerin, *Glycine soya* oil, and a *Calendula officinalis* extract. The composition can contain from about 1 to about 50 w/w decyl oleate. The composition can contain from about 0.5 to about 50% w/w oleyl erucate. The composition can contain from about 0.2 to about 20% w/w magnesium stearate. The composition can contain from about 0.1 to about 10% w/w zinc stearate. The composition can contain from about 1.5 to about 50 w/w zinc oxide. The composition can contain from about 0.3 to about 30% w/w glycerin. The composition can contain from about 0.05 to about 5% w/w *G. soya* oil. The composition can contain from about 0.00125 to about 0.125% w/w *C. officinalis* extract. The composition can further contain dicaprylyl ether. The composition can contain from about 0.5 to about 50 w/w dicaprylyl ether. The composition can further contain polyglyceryl-2 dipolyhydroxystearate. The composition can contain from about 0.3 to about 30% w/w polyglyceryl-2 dipolyhydroxystearate. The composition can further contain polyglyceryl-3 diisostearate. The composition can contain from about 0.2 to about 20% w/w polyglyceryl-3 diisostearate. The composition can further contain sodium chloride. The composition can contain from about 0.15 to about 15 w/w sodium chloride. The composition can further contain benzyl alcohol. The composition can contain from about 0.08 to about 8% w/w benzyl alcohol. The composition can further contain sodium benzoate. The composition can contain from about 0.03 to about 3% w/w sodium benzoate. The composition can further contain ethylhexlglycerin. The composition can contain from about 0.018 to about 1.8% w/w ethylhexylglycerin. The composition can further contain potassium sorbate. The composition can contain from about 0.016 to about 1.6% w/w potassium sorbate. The composition can further contain tocopherol. The composition can contain from about 0.00015 to about 0.015 tocopherol. The magnesium stearate and the zinc stearate can be present in the composition at a ratio of about 2:1 magnesium stearate:zinc stearate. The composition can have viscosity of about $0.1 \times 10^6$ to about $10 \times 10^6$ centipoise. The composition can be formulated as a cream. The composition can be effective to reduce or prevent one or more symptoms of diaper rash.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the description below. Other features, objects, and advantages of the invention will be apparent from the description and from the claims.

DETAILED DESCRIPTION

This document provides compositions containing ingredients that are safe for use on young children. The compositions provided herein are low irritating (e.g., non-irritating) and hypoallergenic, and typically contain multiple natural (plant-derived) ingredients such as glycerin, *Calendula officinalis* flower extract, and *Glycine soya* oil.

The compositions provided herein can contain any appropriate ingredients, including, without limitation, one or more moisturizers, preservatives, fragrances, pH adjustors, chelating agents, emollients, skin conditioning agents, thickening agents, flow agents, emulsifiers, and stabilizers. Examples of components that can be included in the compositions provided herein are as follows.

Decyl oleate is a plant-derived skin conditioning agent. In some cases, the compositions provided herein can contain decyl oleate in an amount from about 1 to about 50% w/w (e.g., from about 1 to about 5% w/w, from about 5 to about 10% w/w, from about 10 to about 15% w/w, from about 15 to about 25% w/w, or from about 25 to about 50% w/w). In some cases, decyl oleate can be present in a composition provided herein in an amount from about 5 to about 15% w/w (e.g., from about 8 to about 12% w/w).

Oleyl erucate is another plant-derived skin conditioning agent. In some cases, the compositions provided herein can contain oleyl erucate in an amount from about 0.5 to about 50% w/w (e.g., from about 0.5 to about 2.5% w/w, from about 2.5 to about 5% w/w, from about 5 to about 10% w/w, from about 10 to about 25% w/w, or from about 25 to about 50% w/w). In some cases, oleyl erucate can be present in a composition provided herein in an amount from about 2.5 to about 7.5% w/w (e.g., from about 4 to about 6% w/w).

Magnesium stearate is a thickening and flow agent that can be plant-derived. In some cases, the compositions provided herein can contain magnesium stearate in an amount from about 0.2 to about 20% w/w (e.g., from about 0.2 to about 1% w/w, from about 1 to about 2% w/w, from about 2 to about 3% w/w, from about 3 to about 10% w/w, or from about 10 to about 20% w/w). In some cases, magnesium stearate can be present in a composition provided herein in an amount from about 1 to about 3% w/w (e.g., from about 1.5 to about 2.5 w/w).

Zinc stearate also is a thickening and flow agent that can be plant-derived. In some cases, the compositions provided herein can contain zinc stearate in an amount from about 0.1 to about 10% w/w (e.g., from about 0.1 to about 0.5% w/w, from about 0.5 to about 1% w/w, from about 1 to about 2% w/w, from about 2 to about 5% w/w, or from about 5 to about 10% w/w). In some cases, zinc stearate can be present in a composition provided herein in an amount from about 0.5 to about 1.5% w/w (e.g., from about 0.7 to about 1.3% w/w).

Zinc oxide is a naturally-derived, skin-protecting ingredient that can provide a physical barrier to water and irritants. In some cases, the compositions provided herein can contain zinc oxide in an amount from about 1.5 to about 50% w/w (e.g., from about 1.5 to about 5% w/w, from about 5 to about 10% w/w, from about 10 to about 15% w/w, from about 15 to about 25% w/w, or from about 25 to about 50% w/w). In some cases, zinc oxide can be present in a composition provided herein in an amount from about 8 to about 23% w/w (e.g., from about 13 to about 18% w/w).

Glycerin is a humectant that can draw moisture into the skin, and can be plant-derived. In some cases, the compositions provided herein can contain glycerin in an amount from about 0.3 to about 30% w/w (e.g., from about 0.3 to about 1% w/w, from about 1 to about 3% w/w, from about 3 to about 5% w/w, from about 5 to about 10% w/w, or from about 10 to about 30% w/w). In some cases, glycerin can be present in a composition provided herein in an amount from about 1.5 to about 4.5% w/w (e.g., from about 2 to about 3% w/w).

*Glycine soya* oil is a plant-derived skin conditioning agent that can help to moisturize and soften skin. In some cases, the compositions provided herein can contain *G. soya* oil in an amount from about 0.05 to about 5% w/w (e.g., from about 0.05 to about 0.1% w/w, from about 0.1 to about 0.3% w/w, from about 0.3 to about 0.5% w/w, from about 0.5 to about 1% w/w, from about 1 to about 3% w/w, or from about 3 to about 5% w/w). In some cases, *G. soya* oil can be present in a composition provided herein in an amount from about 0.25 to about 0.75% w/w (e.g., from about 0.4 to about 0.6% w/w).

*Calendula officinalis* flower extract (also referred to as *Calendula* oil) is a moisturizer and emollient that can condition and soothe the skin. In some cases, the compositions provided herein can contain a *C. officinalis* extract in an amount from about 0.00125 to about 0.125% w/w (e.g., from about 0.00125 to about 0.005% w/w, from about 0.005 to about 0.01% w/w, from about 0.01 to about 0.05% w/w, from about 0.05 to about 0.1% w/w, or from about 0.1 to about 0.125% w/w). In some cases, a *C. officinalis* flower extract can be present in a composition provided herein in an amount from about 0.007 to about 0.02% w/w (e.g., from about 0.001 to about 0.0017% w/w).

Tocopherol is an emollient, antioxidant, and skin conditioning agent. In some cases, the compositions provided herein can contain tocopherol in an amount from about 0.00015 to about 0.015 w/w (e.g., from about 0.00015 to about 0.0005 w/w, from about 0.0005 to about 0.001% w/w, from about 0.001 to about 0.005% w/w, or from about 0.005 to about 0.015% w/w). In some cases, tocopherol can be present in a composition provided herein in an amount from about 0.0008 to about 0.0024% w/w (e.g., about 0.0012 to about 0.002% w/w).

Benzyl alcohol is a preservative. In some cases, the compositions provided herein can contain benzyl alcohol in an amount from about 0.08 to about 8% w/w (e.g., from about 0.08 to about 0.5% w/w, from about 0.5 to about 1% w/w, from about 1 to about 2% w/w, from about 2 to about 4% w/w, or from about 4 to about 8% w/w). In some cases, benzyl alcohol can be present in a composition provided herein in an amount from about 0.4 to about 1.2% w/w (e.g., from about 0.7 to about 0.9% w/w).

Ethylhexylglycerin also is a preservative. In some cases, the compositions provided herein can contain ethylhexylglycerin in an amount from about 0.018 to about 1.8% w/w (e.g., from about 0.018 to about 0.05% w/w, from about 0.05 to about 0.1% w/w, from about 0.1 to about 0.2% w/w, from about 0.2 to about 1% w/w, or from about 1 to about 1.8% w/w). In some cases, ethylhexylglycerin can be present in a composition provided herein in an amount from about 0.08 to about 0.27% w/w (e.g., from about 0.15 to about 0.22% w/w).

Dicaprylyl ether is a plant-derived skin conditioning agent. In some cases, the compositions provided herein can contain dicarpylyl ether in an amount from about 0.5 to about 50% w/w (e.g., from about 0.5 to about 3% w/w, from about 3 to about 5% w/w, from about 5 to about 15% w/w, from about 15 to about 25% w/w, or from about 25 to about 50% w/w). In some cases, dicaprylyl ether can be present in a composition provided herein in an amount from about 2.5 to about 7.5 w/w (e.g., from about 4 to about 6% w/w).

Polyglyceryl-2 dipolyhydroxystearate is a plant-derived emulsifier. In some cases, the compositions provided herein can contain polyglyceryl-2 dipolyhydroxystearate in an amount from about 0.3 to about 30% w/w (e.g., from about 0.3 to about 1% w/w, from about 1 to about 3% w/w, from about 3 to about 5% w/w, from about 5 to about 10% w/w, or from about 10 to about 30% w/w). In some cases, polyglyceryl-2 dipolyhydroxystearate can be present in a composition provided herein in an amount from about 1.5 to about 4.5% w/w (e.g., from about 2.5 to about 3.5 w/w).

Polyglyceryl-3 diisostearate is another plant-derived emulsifier. In some cases, the compositions provided herein can contain polyglyceryl-3 diisostearate in an amount from about 0.2 to about 20% w/w (e.g., from about 0.2 to about 1% w/w, from about 1 to about 2% w/w, from about 2 to about 3% w/w, from about 3 to about 10% w/w, or from about 10 to about 20% w/w). In some cases, polyglyceryl-3 diisostearate can be present in a composition provided herein in an amount from about 1 to about 3% w/w (e.g., from about 1.5 to about 2.5 w/w).

Sodium chloride can serve as a stabilizer. In some cases, the compositions provided herein can contain sodium chloride in an amount from about 0.15 to about 15% w/w (e.g., from about 0.15 to about 0.5% w/w, from about 0.5 to about 1% w/w, from about 1 to about 2% w/w, from about 2 to about 5% w/w, or from about 5 to about 15% w/w). In some cases, sodium chloride can be present in a composition provided herein in an amount from about 0.75 to about 2.25% w/w (e.g., from about 1.2 to about 1.8% w/w).

Sodium benzoate is a preservative. In some cases, the compositions provided herein can contain sodium benzoate in an amount from about 0.03 to about 3% w/w (e.g., from about 0.03 to about 0.1% w/w, from about 0.1 to about 0.3% w/w, from about 0.3 to about 0.5% w/w, from about 0.5 to about 1% w/w, or from about 1 to about 3% w/w). In some cases, sodium benzoate can be present in a composition provided herein in an amount from about 0.16 to about 0.48% w/w (e.g., from about 0.25 to about 0.37% w/w).

Potassium sorbate also is a preservative. In some cases, the compositions provided herein can contain potassium sorbate in an amount from about 0.016 to about 1.6% w/w (e.g., from about 0.016 to about 0.05% w/w, from about 0.05 to about 0.1% w/w, from about 0.1 to about 0.5% w/w, from about 0.5 to about 1% w/w, or from about 1 to about 1.6% w/w). In some cases, potassium sorbate can be present in a composition provided herein in an amount from about 0.08 to about 0.24% w/w (e.g., from about 0.12 to about 0.2% w/w).

In some cases, the compositions provided herein also can contain one or more fragrance compounds (e.g., one or more plant-derived fragrance compounds). In some cases, the compositions provided herein can contain one or more fragrance compounds in an amount from about 0.05 to about 5% w/w (e.g., from about 0.05 to about 0.1% w/w, from about 0.1 to about 0.5% w/w, from about 0.5 to about 1% w/w, from about 1 to about 2.5% w/w, or from about 2.5 to about 5% w/w). In some cases, fragrance compounds can be present in a composition provided herein in an amount from about 0.2 to about 0.8% w/w (e.g., from about 0.3 to about 0.7% w/w).

In addition, the compositions provided herein can include water, which can make up the remainder of the composition apart from the other ingredients. In some cases, the compositions provided herein can contain water in an amount from about 40 to about 80% w/w (e.g., from about 40 to about 45% w/w, from about 45 to about 50% w/w, from about 50 to about 55% w/w, from about 55 to about 60% w/w, from about 60 to about 70% w/w, or from about 70 to about 80% w/w). In some cases, water can be present in a composition provided herein in an amount from about 25 to about 75 w/w (e.g., about 35 to about 65% w/w, or about 45 to about 55% w/w).

Any appropriate combination of the ingredients listed above can be used in the compositions provided herein. In some cases, for example, a composition can include decyl oleate, oleyl erucate, magnesium stearate, zinc stearate, zinc oxide, glycerin, *Glycine soya* oil, a *Calendula officinalis* extract, and optionally, tocopherol. In addition, in some cases, a composition provided herein also can include any one or more of the other ingredients listed above. Moreover, a composition provided herein can further include any other appropriate ingredient (e.g., any other suitable humectant, moisturizer, preservative, fragrance, pH adjustor, chelating agent, emollient, stabilizer, skin conditioning agent, thickening agent, or flow agent).

It is noted that including a combination of magnesium stearate and zinc stearate in the compositions provided herein can provide the resulting products with an appropriate viscosity, can assist with "glide" of the produce, and can help to reduce or prevent chafing when applied to the skin that will be under a diaper, for example. The magnesium stearate and zinc stearate can be present in a composition provided herein at any appropriate ratio. In some cases, for example, the magnesium stearate:zinc stearate ratio in a composition provided herein can be about 1.5:1, about 2:1, or about 2.5:1.

The compositions described herein can have any appropriate pH. In general, the pH of the compositions is such that they are low irritating (e.g., non-irritating) to the skin or eyes. In some cases, a composition provided herein can have a pH of about 5 to about 7 (e.g., from about 5.0 to about 5.3, from about 5.2 to about 5.5, from about 5.4 to about 5.7, from about 5.7 to about 6.0, from about 6.0 to about 6.3, from about 6.2 to about 6.5, from about 6.4 to about 6.7, or from about 6.7 to about 7.0).

The compositions provided herein also can have any appropriate viscosity. In some cases, a diaper cream composition provided herein can have a viscosity from about $0.1 \times 10^6$ to about $10 \times 10^6$ centipoise (cps) (e.g., from about $0.1 \times 10^6$ to about $1 \times 10^6$ cps, from about $1 \times 10^6$ to about $2 \times 10^6$ cps, from about $2 \times 10^6$ to about $3 \times 10^6$, from about $3 \times 10^6$ to about $3.2 \times 10^6$ cps, from about $3 \times 10^6$ to about $4 \times 10^6$ cps, from about $4 \times 10^6$ to about $5 \times 10^6$ cps, from about $5 \times 10^6$ to about $6 \times 10^6$ cps, from about $6 \times 10^6$ to about $8 \times 10^6$ cps, or from about $8 \times 10^6$ to about $10 \times 10^6$ cps).

The compositions provided herein can be packaged in any appropriate container for dispensing by a user. It is noted that the viscosity of a composition can bear on the size of the orifice through which the composition can readily be dispensed. A container for a composition provided herein can have an orifice of any appropriate size (e.g., about 3 to about 5 mm, about 5 to about 7 mm, about 7 to about 9 mm, or about 5, 6, 7, 8, 9, or 10 mm) for dispensing the composition.

The invention will be further described in the following example, which does not limit the scope of the invention described in the claims.

EXAMPLE

A concept study was conducted through an online survey to assess the attitudes and usage of more than 280 mothers of children aged two years and under. Children of the survey participants were about 50:50 boy:girl, and about 50:50 baby:toddler. Participants indicated that they were open to using a natural baby care product or had tried using a natural baby care product in the past.

A diaper cream composition was prepared according to the formulation in TABLE 1, and was tested in a blind consumer study of 75 participants selected from the concept study based at least in part on their willingness to test the product for a two week period. Participants completed a survey about 40 minutes after placing the cream on their child's bottom. More than 90% of the participants stated that the composition was gentle on their children's skin, easy to spread on skin, and provided long-lasting relief from diaper rash. Similar results were obtained when the composition was pediatrician and dermatologist tested.

TABLE 1

| Ingredient | Active amount (% w/w) |
| --- | --- |
| water | 25-75 |
| zinc oxide | 8-23 |
| decyl oleate | 5-15 |
| oleyl erucate | 2.5-7.5 |
| dicaprylyl ether | 2.5-7.5 |
| polyglyceryl-2 dipolyhydroxystearate | 1.5-4.5 |
| glycerin | 1.5-4.5 |
| polyglyceryl-3 diisostearate | 1-3 |
| magnesium stearate | 1-3 |
| sodium chloride | 0.75-2.25 |
| zinc stearate | 0.5-1.5 |
| benzyl alcohol | 0.4-1.2 |
| *Glycine soja* (soybean) oil | 0.25-0.75 |
| sodium benzoate | 0.16-0.48 |
| ethylhexylglycerin | 0.08-0.27 |
| potassium sorbate | 0.08-0.24 |
| *Calendula officinalis* flower extract | 0.007-0.02 |
| tocopherol | 0.0008-0.0024 |

In further studies, corneometer measurements were taken to assess the hydration level of the superficial skin layers for 30 of the children at baseline, 4 hours after application, and 24 hours after application as needed over the course of one week. As shown in TABLE 2, the composition significantly increased skin hydration levels.

TABLE 2

| | Mean corneometer measurements | | | Mean change from baseline | | |
|---|---|---|---|---|---|---|
| Baseline | 4 hours ± 30 min post-appln | 24 hours ± 30 min post-appln | Week 1 | 4 hours ± 30 min post-appln | 24 hours ± 30 min post-appln | Week 1 |
| 24.0 | 29.9 | 27.2 | 29.7 | 5.9 ($p < 0.0001$) | 3.3 ($p = 0.0181$) | 5.1 ($p = 0.0007$) |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A skin care composition comprising:
   decyl oleate,
   oleyl erucate,
   magnesium stearate present in an amount of from about 0.2 to about 20% w/w of the composition,
   zinc stearate present in an amount of from about 0.1 to about 10% w/w of the composition,
   zinc oxide,
   glycerin,
   *Glycine soya* oil, and
   a *Calendula officinalis* extract present in an amount of from about 0.00125 to about 0.125% w/w of the composition,
   wherein said composition is formulated as a cream.
2. The skin care composition of claim 1, wherein said composition comprises from about 1 to about 50% w/w decyl oleate.
3. The skin care composition of claim 1, wherein said composition comprises from about 0.5 to about 50% w/w oleyl erucate.
4. The skin care composition of claim 1, wherein said composition comprises from about 1 to about 3% w/w magnesium stearate.
5. The skin care composition of claim 1, wherein said composition comprises from about 0.5 to about 1.5% w/w zinc stearate.
6. The skin care composition of claim 1, wherein said composition comprises from about 1.5 to about 50% w/w zinc oxide.
7. The skin care composition of claim 1, wherein said composition comprises from about 0.3 to about 30% w/w glycerin.
8. The skin care composition of claim 1, wherein said composition comprises from about 0.05 to about 5% w/w *G. soya* oil.
9. The skin care composition of claim 1, wherein said composition comprises from about 0.5 to about 50% w/w dicaprylyl ether.
10. The skin care composition of claim 1, wherein said composition comprises from about 0.3 to about 30% w/w polyglyceryl-2 dipolyhydroxystearate.
11. The skin care composition of claim 1, wherein said composition comprises from about 0.2 to about 20% w/w polyglyceryl-3 diisostearate.
12. The skin care composition of claim 1, wherein said composition comprises from about 0.15 to about 15% w/w sodium chloride.
13. The skin care composition of claim 1, wherein said composition further comprises benzyl alcohol.
14. The skin care composition of claim 13, wherein said composition comprises from about 0.08 to about 8% w/w benzyl alcohol.
15. The skin care composition of claim 1, wherein said composition further comprises sodium benzoate.
16. The skin care composition of claim 15, wherein said composition comprises from about 0.03 to about 3% w/w sodium benzoate.
17. The skin care composition of claim 1, wherein said composition further comprises ethylhexylglycerin.
18. The skin care composition of claim 17, wherein said composition comprises from about 0.018 to about 1.8% w/w ethylhexylglycerin.
19. The skin care composition of claim 1, wherein said composition further comprises potassium sorbate.
20. The skin care composition of claim 19, wherein said composition comprises from about 0.016 to about 1.6% w/w potassium sorbate.
21. The skin care composition of claim 1, wherein said composition further comprises tocopherol.
22. The skin care composition of claim 21, wherein said composition comprises from about 0.00015 to about 0.015% w/w tocopherol.
23. The skin care composition of claim 1, wherein said magnesium stearate and said zinc stearate are present in said composition at a ratio of about 2:1 magnesium stearate:zinc stearate.
24. The skin care composition of claim 1, wherein said composition has a viscosity of about $0.1 \times 10^6$ to about $10 \times 10^6$ centipoise.
25. The skin care composition of claim 1, wherein said composition is effective to reduce or prevent one or more symptoms of diaper rash.
26. The skin care composition of claim 1, wherein said composition comprises:
   decyl oleate present in an amount of from about 5 to about 15% w/w of the composition,
   oleyl erucate present in an amount of from about 2.5 to about 7.5% w/w of the composition,
   magnesium stearate present in an amount of from about 1 to about 3% w/w of the composition,
   zinc stearate present in an amount of from about 0.5 to about 1.5% w/w zinc stearate of the composition, zinc oxide present in an amount of from about 8 to about 23% w/w of the composition, glycerin present in an amount of from about 1.5 to about 4.5% w/w of the composition,

*Glycine soya* oil present in an amount of from about 0.25 to about 0.75% w/w of the composition, and a *Calendula officinalis* extract present in an amount of from about 0.00125 to about 0.125% w/w of the composition.

27. The skin care composition of claim 1, wherein said composition comprises a preservative comprising at least one of benzyl alcohol, sodium benzoate, ethylhexylglycerin, and potassium sorbate.

28. The skin care composition of claim 27, wherein said composition comprises:

benzyl alcohol present in an amount of from about 0.08 to about 8% w/w of the composition, sodium benzoate present in an amount of from about 0.03 to about 3% w/w of the composition, ethylhexylglycerin present in an amount of from about 0.018 to about 1.8% w/w of the composition, or potassium sorbate present in an amount of from about 0.016 to about 1.6% w/w of the composition.

29. A skin care composition comprising:

decyl oleate, oleyl erucate, magnesium stearate present in an amount of from about 0.2 to about 20% w/w of the composition, zinc stearate present in an amount of from about 0.1 to about 10% w/w of the composition, zinc oxide, glycerin,

*Glycine soya* oil, a *Calendula officinalis* extract present in an amount of from about 0.00125 to about 0.125% w/w of the composition, and a preservative comprising at least one of benzyl alcohol, sodium benzoate, ethylhexylglycerin, and potassium sorbate.

30. The skin care composition of claim 29, wherein said composition comprises:

benzyl alcohol present in an amount of from about 0.08 to about 8% w/w of the composition, sodium benzoate present in an amount of from about 0.03 to about 3% w/w of the composition, ethylhexylglycerin present in an amount of from about 0.018 to about 1.8% w/w of the composition, or potassium sorbate present in an amount of from about 0.016 to about 1.6% w/w of the composition.

* * * * *